A. JANSSON.
CUTTING TOOL.
APPLICATION FILED AUG. 29, 1919.
1,366,005.
Patented Jan. 18, 1921.
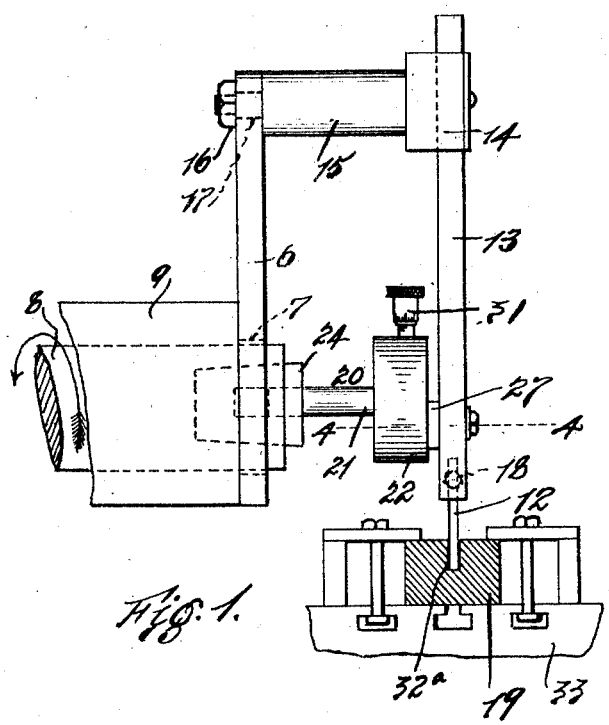
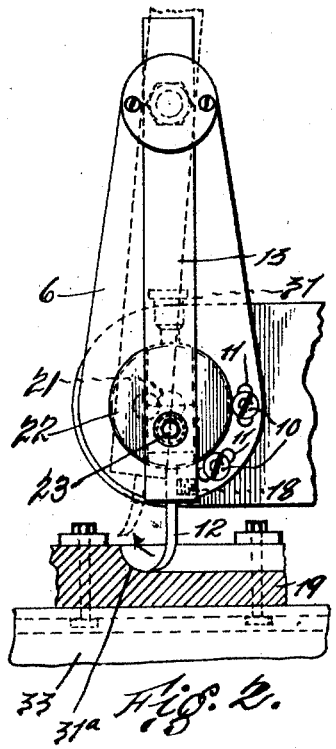
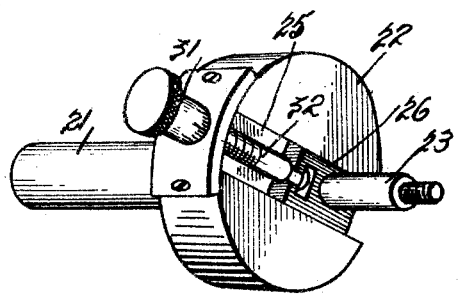
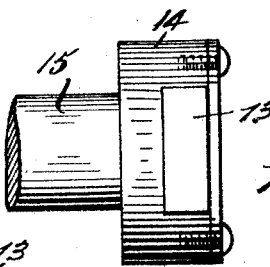
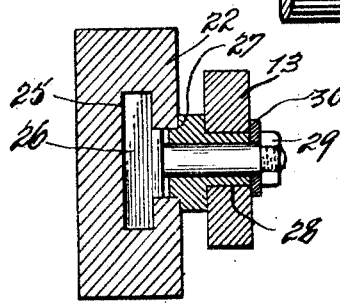
INVENTOR
Arvid Jansson
BY
Edward A. Janus
ATTORNEY

UNITED STATES PATENT OFFICE.

ARVID JANSSON, OF BROOKLYN, NEW YORK, ASSIGNOR TO MARF MACHINE & DIE CASTING CO., INC., OF NEW YORK, N. Y., A CORPORATION OF NEW YORK.

CUTTING-TOOL.

1,366,005.  Specification of Letters Patent.  Patented Jan. 18, 1921.

Application filed August 29, 1919. Serial No. 320,575.

*To all whom it may concern:*

Be it known that I, ARVID JANSSON, a citizen of the United States of America, residing at Brooklyn, county of Kings, State of New York, have invented certain new and useful Improvements in Cutting-Tools, of which the following is a full, clear, and exact description.

This invention relates to improvements in cutting tools, one of the objects being to provide a tool by which means curved surfaces of small radius can be produced.

The chief object of my invention is to obviate the necessity of forming curved surfaces by hand, thereby reducing the cost of producing articles requiring such surfaces, such as dies employed to produce die-castings. To form curved surfaces, especially when said surfaces are located within a slot, hand labor is required owing to the fact that a milling cutter small enough to cut the surface cannot be inserted within the slot, and so far as I am aware, I am the first to produce a tool that will accomplish the result. My improved tool is arranged for attachment to a milling machine or any other machine having a rotatable spindle adapted to operate same.

In the accompanying drawing, which forms part of this specification,

Figure 1 is a side elevation of my improved tool, a portion of a rotatable spindle and support therefor, being also illustrated;

Fig. 2 is an end view thereof, looking from the right in Fig. 1;

Fig. 3 is an enlarged perspective view of the cutter operating device;

Fig. 4 is an enlarged cross-sectional view thereof, the section being taken on a line 4—4 in Fig. 3; and Fig. 5 is an enlarged top plan view of the head-piece and slidable tool carrying bar.

My improved cutting tool can either be arranged for attachment to a milling machine, for instance, or incorporated in a machine by itself, preferably the device will be arranged as an attachment to a milling machine.

As herein arranged, the tool consists of a hanger or bracket 6 provided with a bore or opening 7 to receive the end of the spindle 8 of a milling machine, for instance, a carrier for the spindle being indicated by 9. I have not illustrated any particular form of milling machine, but it will be understood that a portion of a rotatable spindle is indicated by 8 and a portion of a machine frame by 9. The bracket 6 will be secured to the frame 9 by bolts 10 passing through slots 11 in order that the frame 6 can be angularly adjusted to suit the cutter 12. The cutter 12 is carried by a bar 13 slidably fitted, at its upper end, in a head-block 14, which in turn is carried by an arm 15, rotatably secured to the frame 6 by a nut 16 which engages a threaded cylindrical lug 17, carried by the arm 15. The cutter 12 will be removably secured or held by the slidable bar 13 by a set screw 18. To accomplish the desired result, the bar 13 will have imparted thereto a combined oscillatory and vertical movement to cause the tool 12 to engage the work, indicated by 19, and to be drawn upwardly, in contact with the work in a circular path, thereby producing the desired curved surface or fillet. Curved surfaces or fillets of various radii will be produced by varying the radius of the path of movement of the cutter. The action of the cutter will be a scooping or scraping action, but nevertheless a cutting action. To impart to the tool the above mentioned movement, I provide a crank member 20, consisting of a shank member 21, a head 22 and an adjustable crankpin 23, which engages bar 13. The shank member 21 will be engaged by the chuck 24, carried by the spindle 8 of the machine. As can be seen in Fig. 4, the head 22 carries a T slot 25 engaged by a slidable block 26, which carries the crankpin 23. In combination with said crank member, I employ, in this instance, a washer or separator 27, carrying a cylindrical projection 28, which rotatably engages the arm 13. The crank pin 23 passes loosely through the separator and its extension and is engaged by a nut 29 at its outer end, said nut bearing against a washer 30, which bears against the outer end of the projection 28 slightly more than against bar 13, thereby permitting of the rotation of the projection 28 within the bar during the operation of the tool. The nut 29 serves to bind the block 26, separator 27 and head 22 together, to maintain said block in adjusted positions. The radius of the path of the cutter can be varied by adjusting the block 26 toward or away from the axis of head 22 and shank 21. To accurately position the block 26 for a given radius, I may provide a micrometer device indicated by 31 and 32, to shift the block in its slot in the head 22. During the operation of the crank member, the bar 13 will have imparted thereto a combined vertical and oscillatory motion, which will impart to the tool a rotary motion or cause same to describe a circular path proportionate to the distance of the block 26 from the axis of the shank 21. During its circular movement, the tool or cutter 12 will cut a fillet, whose radius is equal to the distance between the axis of shank 21 and axis of crank pin 23, such a fillet being indicated by 31$^a$ in Fig. 2. It will be plainly evident from an inspection of Fig. 1, that the cutter 12 will cut a circular surface of small radius far smaller than could be cut by a milling cutter, especially if such surface should have to be formed within a slot, such as is indicated by 32$^a$ in Fig. 1. A deep slot having a relatively small fillet, at one end or both ends, can be cut by means of my improved device, owing to the combined vertical and reciprocatory movement of the bar 13. It will, of course, be understood that a suitable feed will be imparted to the carrier plate 33, both vertically and horizontally.

Having described my invention, what I claim is:—

1. In combination with a rotatable spindle, a head operated thereby, a block slidable in said head, means to adjust said block toward or away from the axis of said head, a pin carried by said block a carrier operated by said pin, and a cutter carried by said carrier.

2. In a cutting tool, an oscillatory slidably supported carrier, a cutter carried thereby, and a crank mechanism to simultaneously oscillate and impart a sliding movement to the carrier to cause the cutter to travel in a circular path.

3. In a cutting tool, a bracket, a head-block carried thereby arranged for oscillatory motion, a bar slidably supported by said head-block arranged for movement transversely of the axis of said head block, a rotatable head adjacent the free end of said bar, a crank-pin carried by the head engaging said bar whereby said bar will have imparted thereto a combined oscillatory and vertical movement when said head is rotated, and a cutter located at the free end of said bar.

4. In a cutting tool bracket, a head block carried thereby arranged for oscillatory motion, a bar slidably supported by said head block arranged for movement transversely of the axis of said head block, a rotatable head adjacent the free end of said bar, a block carried by said head movable transversely of the axis of the head, a micrometer device to adjust said block with respect to the axis of said head, and a cutter located at the free end of said bar.

Signed at New York city, N. Y., this 2nd day of August 1919.

ARVID JANSSON.

Witnesses:
EDWARD A. JARVIN,
CHARLES D. SPRUNG.